April 21, 1970  R. J. SCHWINGHAMER ETAL  3,507,034
METHOD AND APPARATUS FOR PRECISION SIZING AND
JOINING OF LARGE DIAMETER TUBES
Filed May 8, 1967  6 Sheets-Sheet 1

INVENTORS
ROBERT J. SCHWINGHAMER
J D BENNIGHT
BY
*J. McCoy*
*G. J. Porter*
ATTORNEYS April 21, 1970  R. J. SCHWINGHAMER ETAL  3,507,034
METHOD AND APPARATUS FOR PRECISION SIZING AND
JOINING OF LARGE DIAMETER TUBES
Filed May 8, 1967  6 Sheets-Sheet 2

INVENTORS
ROBERT J. SCHWINGHAMER
J D BENNIGHT
BY
ATTORNEYS

April 21, 1970    R. J. SCHWINGHAMER ETAL    3,507,034
METHOD AND APPARATUS FOR PRECISION SIZING AND
JOINING OF LARGE DIAMETER TUBES
Filed May 8, 1967                                            6 Sheets-Sheet 4

INVENTORS
ROBERT J. SCHWINGHAMER
J D BENNIGHT
BY
ATTORNEYS

United States Patent Office 3,507,034
Patented Apr. 21, 1970

3,507,034
METHOD AND APPARATUS FOR PRECISION SIZING AND JOINING OF LARGE DIAMETER TUBES
Robert J. Schwinghamer and J D Bennight, Huntsville, Ala., assignors to the United States of America as represented by the Administrator of the National Aeronautics and Space Administration
Filed May 8, 1967, Ser. No. 637,882
Int. Cl. B23b *11/00;* B21d *26/14, 39/04*
U.S. Cl. 29—517　　　　　　　　　　　　　　12 Claims

ABSTRACT OF THE DISCLOSURE

A method and apparatus for portable high precision magnetomotive bulging, constricting, and joining of large diameter tubes. The method allows decremental, very accurate changing of the diameter of very large tubes, as well as high quality joints obtained by either bulging or constricting overlapping ends of two tubes. The apparatus consists of a magnetomotive coil positioned either inside or outside of the tube and a non-conducting mandrel (or forming die) on the other side. The magnetomotive coil has square conductors which are recessed, and thus separated by an air gap, from the tube. The constricting coil has a split metal sleeve for withstanding hoop stress. The tube (workpiece) is insulated from the coil by a thin plastic sleeve. The power supply is an electrically floating system.

BACKGROUND OF THE INVENTION

The invention described herein was made by an employee of the United States Government and may be manufactured and used by or for the Government for governmental purposes without the payment of any royalties thereon and therefor.

Field of the invention

This invention relates to a method and apparatus for metal working and more spceifically to a method and apparatus for portable high precision magnetomotive bulging, constricting, and joining of large diameter metal tubes.

Description of the prior art

In recent years, particularly, much effort has been devoted to seeking better tools and techniques for working metals to the shapes required. This working of metal to desired shapes involves a variety of operations, such as sizing, blanking, flaring, stress removal, and other operations which are well known in the art. Among the newly developed tools and techniques for performing metal working operations are those related to the sphere of activity known as electromagnetic forming or magnetomotive forming. This mode of manipulating metal is based on the creation by electrical discharge of an intense magnetic field about a shaped conductor, such as a coil disposed adjacent to the metal workpiece. An induced current is thus caused to flow in the workpiece in a direction opposite to that flowing in the coil. The field associated with this induced current reacts against the magnetic field around the coil producing intense forces between the coil and the metallic workpiece. If the coil has a degree of structural or inertial rigidity greater than the workpiece, a yielding of the workpiece under the magnetic forces will occur.

Working of metal with electromagnetic forces has several intrinsic and important advantages. The isodynamic forces are distributed relatively uniformly through the material which is being manipulated, effecting a natural reshaping without causing appreciable change in the grain structure of the material. Very high strain rates may be achieved, affording heretofore impossible accomplishments in the forming of hardened materials. Surface marring of the workpiece, a bothersome aspect of more conventional forming techniques, can be avoided in magnetomotive forming. The entire operation is clean, dry, easy to execute, and may be performed with apparatus essentially free of moving parts.

Although prior art devices and methods for magnetomotive forming offer inherent advantages in comparison to more conventional practices, relatively few tools suitable for specific job situations and applications have been introduced. Many times, it is impractical or impossible to bring the workpiece to the metal forming equipment. For example, in the fabrication of large metallic structures, such as rocket vehicles, sizing, blanking, and stress removal operations are frequently required. Also, the great size and weight of the components prohibit movement and application of the components to the forming equipment. Therefore, a fully portable device is needed which not only can be readily moved into proximity to the workpiece but which can be applied directly to the particular workpiece area that is to be manipulated.

One particular problem which plagues engineers who deign and fabricate large aerospace rockets is the difficulty in obtaining large metal tubes which are manufactured to close enough tolerances. Large rocket engines use liquid oxygen at a rate of several tons per second, fed through large metal liquid oxygen lines. These lines pass down through the fuel tank and are covered by an oversize aluminum alloy tunnel which allows an insulating gap between the fuel line and the tunnel. Particular difficulties have been encountered in obtaining tunnels of close enough tolerance to insure their successful welding into mating fittings in the bulkheads or tank ends. Therefore, a method of precision sizing was needed to bring the large tubes into usable tolerance.

The accomplishment of bulging large metal tubes as practiced in the prior art involves very high hydraulic pressures plus a requirement for massive end loading forces. The equipment is not only extremely massive but quite expensive as well. In operation it is clumsy, cumbersome, and relatively complicated.

Constriction of large tubes as taught by the prior art is accomplished by one of two methods:

(1) The tube is made undersized and an expanding mandrel is used to bring the tube to the required diameter by exerting pressure on the inside of the tube; or (2) The oversized tubes are "worked" back down to the proper diameter by a repetitive impaction on the tube by a set of "guillotine dies."

Both the hydraulic bulging and constricting prior art methods just described have the following disadvantages:

(1) Fuids and high pressures are frequently used and leaks, safety, messiness, and precision control are always a problem.

(2) Work hardening is frequently a serious problem in conventional bulging or constricting work; therefore, heat treating operations are frequently required to obtain the desired level of strength.

(3) Forming takes place at such low energy rate levels that actual material rupture is a constant worry; conventional formability is the rule.

(4) The distribution of the forming force is planar and laminar and certainly non-isodynamic.

(5) Strain rates attained are quite low relative to the magnetomotive method and formability is in no way comparable with the magnetomotive technique, where high strain rates allow forming of high strength alloys in the hardened condition.

(6) The equipment required for bulging or constricting of large tubes is by no means portable. Rather, it is massive and non-mobile, with very little flexibility.

As has been discussed previously, the concept of magnetomotive metal forming is known in the prior art. However, the prior art magnetomotive devices have been limited to the forming of small objects, using small coils. These magnetomotive devices previously proposed suffer from a number of drawbacks. Coil designs in particular in the prior art devices are not capable of handling the voltages and currents necessary to form the large diameter tubes. In actual tests, these coils have deteriorated quite rapidly in use. The quantity of energy delivered by them was deficient, variable, and unpredictable from one discharge to the next. The occurence of electrical arcing from the coil to the workpiece could not be tolerated because of the attendant danger of marring or destruction of the workpiece. These objectionable features of the prior art devices have been found to be largely attributable to their design, particularly their coil design, and to the selection and arrangement of the materials in the coil.

Some of the prior art magnetomotive devices heat the workpiece before forming it. This has the disadvantage of allowing the workpiece to distort by relieving residual stresses. Moreover, heating the workpiece may remove the temper of the metal or otherwise adversely affect the character of the metal in the workpiece, and except for certain refractory metals, is generally not desirable when forming in the hardened high strength condition, as the present invention allows.

Lastly, it has been noted that the method of employment of the prior art devices was not suitable for use with large metal tubes because of the particular problems involved and the inability to cope with the very high power required.

SUMMARY OF THE INVENTION

Accordingly, it is an object of this invention to provide a method and apparatus for portable sizing and joining of large diameter metal tubes which allows greater precision and accuracy than with prior art devices.

It is a further object of the invention to provide a method and apparatus for sizing and joining large metal tubes which allows working directly with the hardened, high strength materials, thus eliminating welding, heat treating, and distortion.

It is a still further object of this invention to provide a method and apparatus which allows successful magnetomotive forming of very large metal tubes using very large coils, without coil breakdown.

These and other objects are accomplished in the present invention in which an electrical circuit having a bank of fast discharge type capacitors is connected by means of a switch to a magnetomotive coil through low inductance cables. The coil has a plurality of turns which are recessed into the coil form so as to create a specially calculated air gap between the conductors and the tube to be sized. Application of power to the circuit causes pressure of the order of 840 pounds per square inch which, for example, is sufficient to affect high precision sizing of a 25 inch diameter, .224 inch thickness wall cylinder of high strength aluminum alloy to as much as a .100 inch diameter reduction.

BRIEF DESCRIPTION OF THE DRAWINGS

The invention will be more fully understood when taken together with the accompanying drawings in which.

DESCRIPTION OF THE PREFERRED EMBODIMENT

Figure 1:
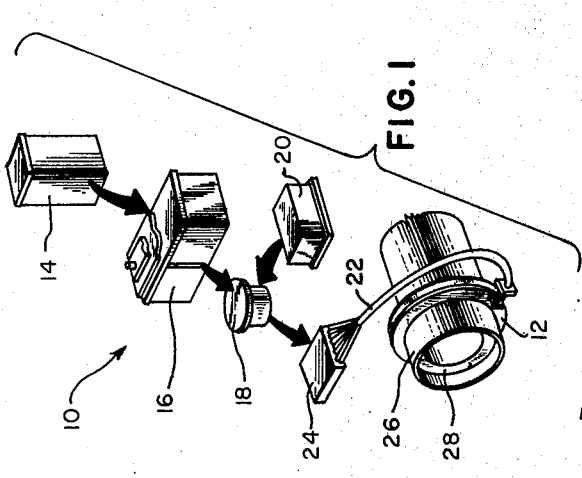
FIGURE 1 is a flow diagram showing the components of an illustrative embodiment of the invention used for constricting a large diameter tube.

With continued reference to the accompanying figures, and with initial attention directed to FIGURE 1, reference number 10 generally designates an illustrative embodiment of the invention used for reduction sizing of large thin-walled metal tubing. A principal component of the invention is the shrinking coil 12. A portable power supply is provided for supplying and controlling pulses of electrical energy so as to produce a varying field of high intensity about the coil 12. This power supply includes a high voltage source 14 for charging a bank of capacitors 16. Connected to the capacitor bank 16 is a switching means 18, such as an ignitron. The switching means 18 is operated by a trigger 20. The electrical energy system just described, which has an energy capability of about 240 kilojoules, is connected to the coil 12 by a plurality of transmission lines 22, preferably co-axial cables, which enter the electrical energy system through a connector box 24. It is desirable that the transmission lines 22 be quite long so that the coil 12 may be taken a considerable distance from the power supply to the location of the workpiece 26.

The entire system is electrically floating, which prevents the setting up of high voltage stresses between the work coil and the workpiece. This also prevents the dangerous situation which is encountered when one uses a grounded system, and the workpiece is actually poorly grounded. This can be lethal, because of the high potentials which result from high current flowing through a poor (high resistance) ground.

Considerations behind the design of constricting coil 12 are as follows:

It has been determined in plasma physics work that magnetic field pressure follows the basic relationship:

$$P = B^2 / 2U$$

where P is the pressure in Newtons per square meter, B is the magnetic field strength in Teslas, and $U = 1.25 \times 10^{-6}$ in air in the mks. system of units.

From this, it is easily shown that one megagauss (100 Teslas) is roughly equivalent to 580,000 p.s.i. of actual pressure. This is generally indicative of the tremendous pressures attainable by the magnetic field techniques.

In the following example, it is assumed that a 25″ diameter, .224″ wall thickness cylinder of aluminum alloy is to be precision constricted .100″ in diameter. For such a cylinder, the longitudinal yield is 47,000 p.s.i. and the transverse yield is 46,000 p.s.i. However, hoop stress effects come into play quite beneficially, so that the actual magnetic pressure required to constrict the cylinder by exceeding the yield is considerably less than the above values. This is calculated as follows:

$$Pm = \frac{2st}{d} = \frac{(2)(47 \times 10^3)(.224)}{25} = 840 \text{ p.s.i.}$$

where Pm is the magnetic pressure in p.s.i. required to exceed the yield, S is the hoop stress equivalent of the yield (47,000 p.s.i.), t is the cylinder wall thickness, and d is the tunnel diameter.

Therefore, 840 p.s.i magnetic pressure will cause yielding, and any magnetic pressure in excess will be sure to produce good forming. A pressure of 840 p.s.i. is equivalent to $5.82 \times 10^6$ Newtons per square meter. A coil configuration is then calculated, based on experience, which strikes a reasonable balance between area to be worked, and inherent inductance. Then, the magnetic field strength required to attain 840 p.s.i. ($5.82 \times 10^6$ Newtons per square meter) pressure is computed as follows:

$$Bp = [(P)(2U)]^{1/2}$$
$$= 3.8 \text{ Tesla}$$

This is the value of peak field strength which will cause yielding of the material. To attain that field, one must now consider the current required to do this. It has been determined empirically by the inventors that the following relationship holds:

$$Ip = (Bp)(D)/(K)(4 \times 10^{-7})$$
$$= 60,325 \text{ amperes}$$

Where Ip is the peak current at first maximum, D is the coil diameter in meters, K is a constant which is approximately 100 for a coil of this configuration.

Now, with a given pulse discharge system, and a given work coil, the voltage used will then determine the current obtained. This value of voltage which gives 60,325 amperes, in the case under consideration, can be determined as follows:

$$E = \frac{IL^{1/2}}{C^{1/2}}$$
$$= 8.5 \text{ kv.}$$

Where E is the capacitor charge voltage, L is the system inductance under loaded conditions, C is the capacitance of the bank and I is the current in amperes.

Therefore, the design data has produced the following information:

(1) Field required (considering hoop stress): 3.8 Tesla.
(2) Current to attain 3.8 Tesla: 64,000 amperes.
(3) Voltage needed on a 1200 µf. capacitor bank to meet above requirements: 8.5 kilovolts.

Tests and application have shown this method reliable in determining the threshold of forming under conditions in which constricting coil 12 is employed. The energy required then, to just cause yielding of the material is:

$$Q = \frac{1}{2} CE^2$$
$$= 43,400 \text{ joules}$$

Where Q is energy in joules, C is capacitance in farads and E is voltage in volts.

Figure 2:
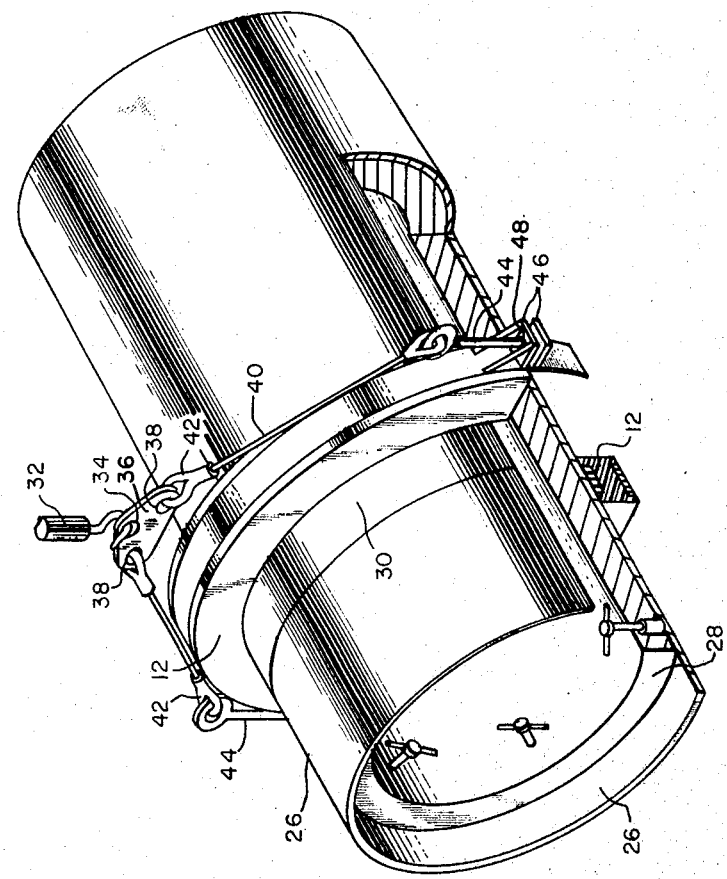
FIGURE 2 is a perspective view showing a constricting coil and mandrel in position on a large diameter tube.

Referring now to FIGURE 2, the portable constricting coil 12 may be seen in position on the workpiece, large, thin-walled tube 26. An undersized mandrel 28 is positioned on the inside of the tube 26, opposite the coil 12. Between the coil 12 and the tube 26 is positioned a thin plastic sleeve 30. This sleeve, which may, for example, be on the order of .007 inch thick, helps prevent arcing between the coil and the workpiece, and therefore prevents the workpiece from becoming a "host" conductor. The coil 12 is suspended from the hook 32 of a hoist (not shown). The hook 32 is fastened into the lifting hole 34 of weight suspension plate 36. Side holes 38 in plate 36 connect with suspension cables 40 having eye fittings 42 at either end. Fittings 42 connect with a pair of eyebolts 44, mounted on opposite sides of the coil 12. Each eyebolt 44 is fastened to a pair of brackets 46 but is electrically insulated from one of the two brackets 46 by an insulator 48, as will be explained below.

Figure 3:
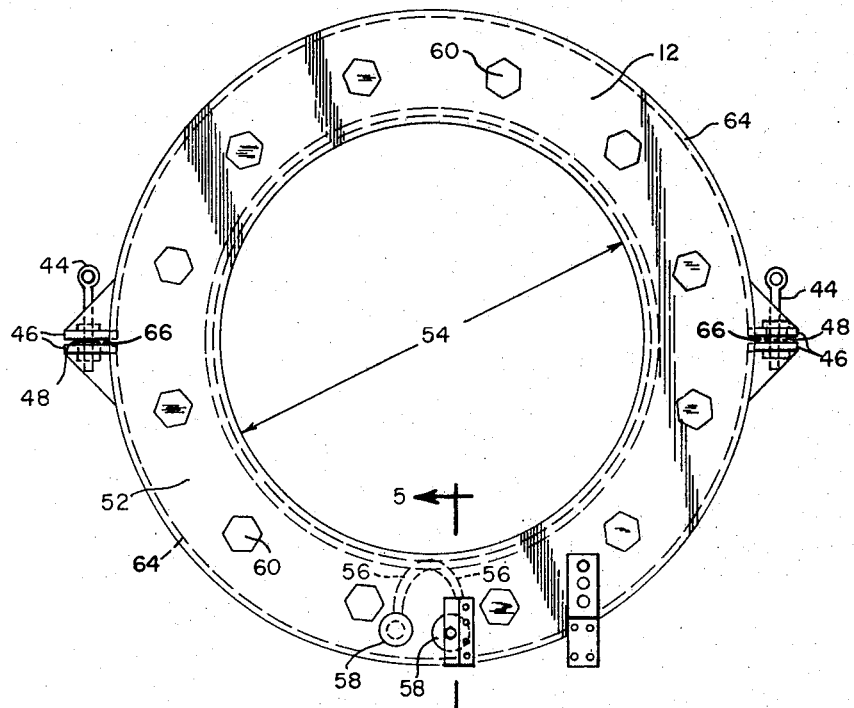
FIGURE 3 is a side elevational view of a constricting coil.
Figure 4:
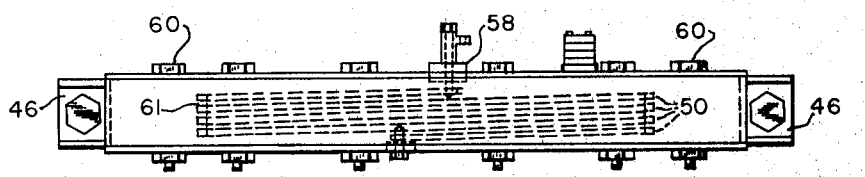
FIGURE 4 is an edge view of the constricting coil of FIGURE 3.
Figure 5:
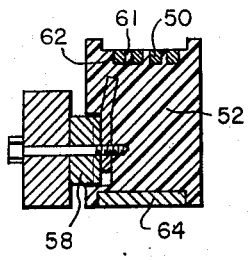
FIGURE 5 is a sectional view of the constricting coil taken along line 5—5 of FIGURE 3.

FIGURES 3, 4, and 5 show the details of the constricting coil 12. As may be seen best in FIGURES 3 and 5, conductor 50 is continuously wound on the inside of the coil form 52 and its turns are recessed considerably from the inside diameter 54 of the coil form 52, for reasons which will be explained below. Conductor 50 has two lead portions 56 which connect to coil conductor terminals 58 located on either side of coil form 52. In order to prevent leads 56 from cutting coil form 52 under the great forces of radial stress during forming, leads 56 are arranged on a rounded path from the inside diameter 54 of the coil form 52 to the terminals 58. Terminals 58 are firmly fastened to coil form 52, which is also for the purpose of preventing shearing of the coil form because of radial stress. For the purpose of preventing shearing of the coil form because of axial stress, stainless steel bolts 60 extend laterally through the coil form 52. Severe hoop tension provides additional tensile and shear resistance.

As may be seen in FIGURE 4, conductor 50 makes four full turns around the inside diameter 54 of the coil form 52. Square wire is used for conductor 50 because this gives much more bearing surface in the axial direction, and the turns then do not shear off the coil form lands 61 due to the tremendous axial compressive forces during discharge. Coil conductor 50 is preferably made of any known material which provides an advantageous tradeoff between good tensile strength and reasonable electrical conductivity. A layer of tough insulating enamel or varnish 62 is used over the conductor 50 to provide additional protection against voltage breakdown.

Looking again at FIGURES 3 and 5, two 180° stainless steel ring segments 64 extend around the outer circumference of the coil form 52 and form a ring which is designed to contain, or withstand, the hoop stress developed during constricting operations. Each of the two ring As mentioned above, brackets 46 of adjacent ring segments 64 has a pair of brackets 46 mounted at its ends. As mentioned above, brackets 46 of adjacent ring segments 64 are fastened together, on both sides of the ring, by eyebolts 44. Eyebolts 44 are used for suspending the coil 12. In addition, they space apart, as well as fasten together, the adjacent brackets 46. Two air spaces 66 separate the two ring segments 64. As also mentioned above, an insulator 48 is used to electrically insulate each eyebolt 44 from one of the two adjacent brackets 46. Thus, the two ring segments 64 are electrically insulated from each other, even though they are securely fastened together. In this way, the coil structure 12 avoids the "shorted turn effect," which would certainly appear as a "one-turn secondary" of a transformer to the work coil 50. Stainless steel is preferred for use in the ring segments because it does not extract much energy from the coil and does not create high repulsion forces. This is because of its high resistivity and the deep penetration of the magnetic field in stainless steel.

Figure 6:
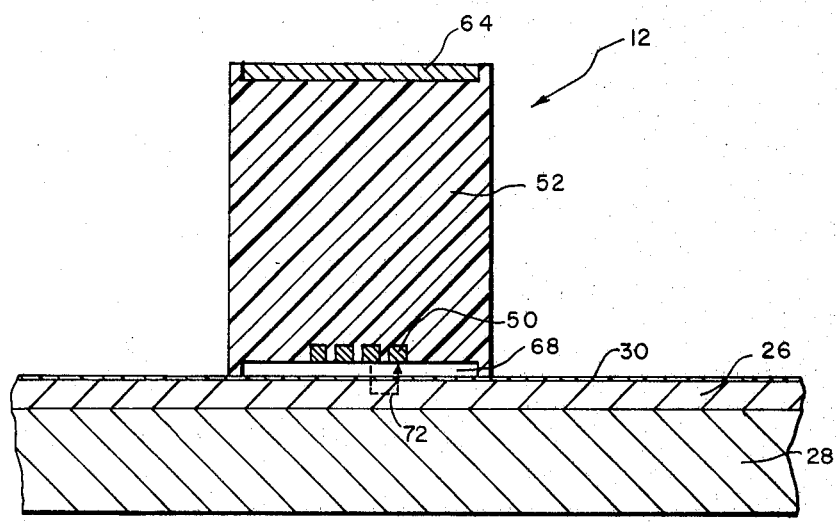
FIGURE 6 is a sectional view of the constricting coil in position on a large diameter tube.

FIGURE 6 shows a sectional view of the constricting coil 12 mounted on a tube 26 with non-conducting mandrel 28 on the inside of the tube 26. Air gap 68 may be seen between the conductors 50 and the tube 26. Also, between the coil 12 and tube 26 is the plastic sheet 30, which was previously described with regard to FIGURE 2.

Air gap 68 is an important feature in the design of the coil 12 of the present invention. In the recess-air-dielectric concept which is employed in the invention, it is emphasized that the rectangular coil conductors 30 are recessed by a specified amount, which is rather critical for optimum results.

The rationale behind the coil design is as follows:
Looking at FIGURE 7, a greatly enlarged sketch may be seen showing a possible arrangement for the coil 12 and workpiece (tube) 26. If one attempts to provide solid insulation 70 over the conductors 50, an almost impossible situation results, this is because the voltage across two dielectric materials (essentially in series) divides in a manner inversely proportional to the dielectric constant. A typical voltage breakdown path is shown at 72. This path passes from conductor 50 through insulators 62 and 70, air gap 68, insulator 30, a portion of the workpiece 26, insulator 30, air gap 68, insulators 70 and 62, and finally back to an adjacent turn of conductor 50.

Figure 7:
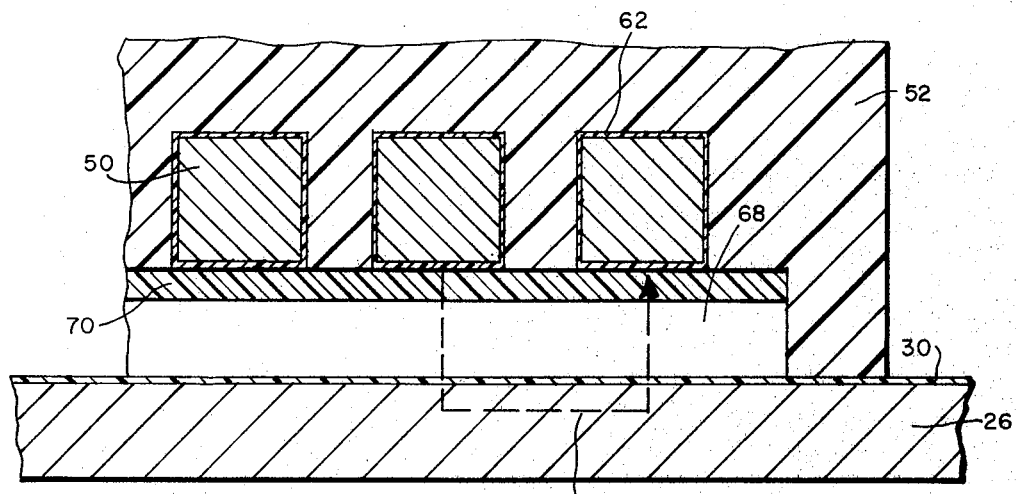
FIGURE 7 is a greatly enlarged sectional view of a constricting coil, showing a possible arrangement of the coil.
Figure 8:
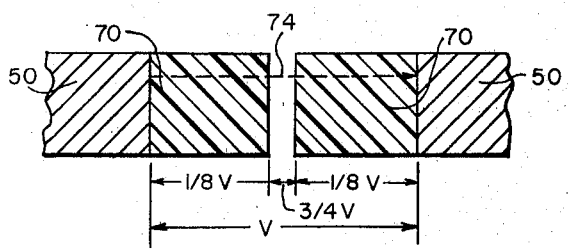
FIGURE 8 is a sectional view illustrating a voltage breakdown path in the magnetomotive sizing coil incorporated into the invention.

FIGURE 8 is a diagram showing a straight-line breakdown path 74 which may be substituted for the indirect voltage breakdown path 72 shown in FIGURE 7, in order to simplify the theoretical considerations involved in voltage breadown. Assuming that: (1) the insulation has a dielectric constant of 3, and (2) the electrical system is "floating," then the voltage V divides as shown in the diagram with ⅛ V across each of the two insulator portions. This means that ¾ the turn-to-turn voltage gradient will appear across the air gap. Values one might ordinarily assume for insulation thickness and air gap could be ⅛ inch and perhaps as little as .003 inch, respectively. If the total voltage drop across the insulation is ¼ V, then the voltage drop across each of the two portions of insulating material is ⅛ V. If the coil is a four-turn, 10-kilovolt coil, then $$V = \frac{10 kv.}{4} = 2.5 kv.$$

The dielectric stress (volts/inch) for both pieces of insulating material in the breakdown path of a 10 kv., four-turn coil is then:

$$\text{stress (insulator)} = \frac{(\tfrac{1}{8}V + \tfrac{1}{8}V)(2.5 \times 10^3)}{\tfrac{1}{4} \text{ inch thick}} =$$

2.5×10³ volts/inch or 2.5 volts/mil (a value which is quite safe).

However, the air gap is stressed as follows:

$$\text{stress (air)} = \frac{\tfrac{3}{4}V(2.5 \times 10^3)}{.006 \text{ inch thick}} = 312{,}000 \text{ volts/inch}$$

(a value which will certainly cause breakdown of the air gap; arcing is inevitable)).

In the dangerous situation where the workpiece is grounded, the value of V will be 10 kv. instead of 2.5 kv. The dielectric stress across the one piece of insulation will then be:

$$\text{stress (insulation)} = \frac{(\tfrac{1}{4}V)(10^4 \text{ volts})}{\tfrac{1}{8} \text{ inch}} =$$

20,000 volts/inch or 20 volts/mi (which is still completely safe for the insulation).

However, the stress in the air gap gets even higher:

$$\text{stress (air)} = \frac{\tfrac{3}{4}V(10^4 \text{ volts})}{.003} = \frac{7500v}{.003} =$$

2,500,000 volts/inch (a value which is dangerous, but represents "over-kill" in a sense, since the lower air stress obtained with the ungrounded workpiece would already cause trouble).

Obviously, then, one must arrive at the proper proportion of air gap versus solid dielectric material to avoid serious breakdown problems. The solution to adequate air gap protection may be calculated as follows:

$$\text{gap} = 2.5 \times 10^3 \text{ volts} \times \frac{1 \text{ inch}}{76{,}200 \text{ volts}} = .0328 \text{ inch}$$

This means that a .0328 inch gap would barely stand off the voltage. For safety, this is usually doubled. When this is done, voltage breakdown problems are virtually eliminated. This causes some reduced coil efficiency because of poorer coupling but this is compensated for by the fact that the field profile is much more constant at that distance, and the coil then is much less sensitive to coupling and energy content variations.

For example, in operation, the coil is pulsed and moved incrementally along the periphery being sized. It was found that successive passes over the same area produced further reductions in diameter over the same mandrel, and fortunately, it proves to be a decremental decrease in diameter so that really fine precision sizing is possible. Table 2 shows this effect for a total of four passes.

TABLE 2.—DECREMENTAL DECREASE IN .224 INCH WALL THICKNESS LIQUID OXYGEN TUNNEL WITH SUBSEQUENT PASSES OF FORMING COIL

| Measured | Outside diameter (inches) | Reduction (inches) |
|---|---|---|
| Before Pass #1 | 25.530 | |
| After Pass #1 | 25.438 | .092 |
| After Pass #2 | 25.411 | .027 |
| After Pass #3 | 25.402 | .009 |
| After Pass #4 | 25.397 | .005 |

Thus, it may be seen that the constricting coil of the present invention solves the very serious design problem of voltage breakdown inherent in large coils. In addition, it provides, as an auxiliary benefit, much more accurate results than were possible before. Moreover, in spite of repeated sizing shots, very little work hardening results.

Referring back to FIGURE 1, one cycle of operation of the invention operating in the constricting mode follows: Power supply 14 furnished power to capacitor bank 16, where the power is stored. When trigger unit 20 closes ignition switch 18, power from capacitor bank 14 is switched into connector box 24 and then through co-axial transmission lines 22 to constricting coil 12. When coil 12 receives the power pulse, an intense magnetic field is set up about the coil 12. Also, a current is induced in the workpiece 26. This induced current flows in a direction opposite to the direction of the current flowing in the coil 12. The magnetic field around the workpiece 26 reacts against the magnetic field around the coil 12, producing intense forces between the coil 12 and the workpiece 26. Since the coil 12 has a greater structural rigidity than the workpiece 26, a yielding of the workpiece occurs.

Different modes of operation of the constricting device are possible. For example, the coil 12 may be pulsed several times in position, or coil 12 may be pulsed and moved incrementally along the surface of the tube 26. In either mode, successive pulses yield a decremental decrease in the diameter of the tube 26. Therefore, after several passes in either mode, very fine precision sizing of the tube 26 may be accomplished.

Figure 9:
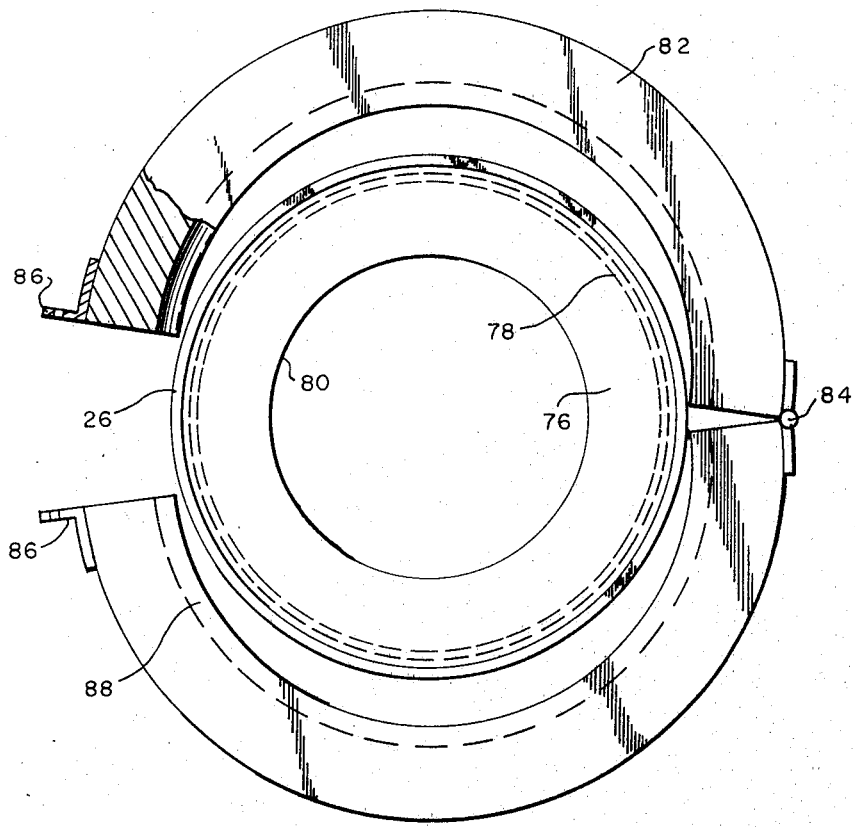
FIGURE 9 is an end view of a large thin-walled tube with a bulging coil inside the tube and a shaping die outside the tube.

FIGURE 9 shows an illustrative embodiment of the invention which may be used for expanding or bulging a large tube 26. A bulging coil 76 is positioned on the inside of the tube 26. Conductors 78 of the bulging coil are wound on the outside of the coil form 80 of the bulging coil 76. Outside forming die 82 is shown in a slightly open condition, in a position opposite the bulging coil 76. Die 82 is equipped with a hinge 84 and a pair of locking brackets 86. Die 82 also has a concave portion 88 which allows room for the tube 26 to be expanded by the bulging coil 76. When forming die 82 is closed and the bulging coil 76 is pulsed, tube 26 is bulged outward in a convex configuration (see 90 in FIGURE 12) which conforms to the shape of the concave portion 88 of die 82.

Figure 10:
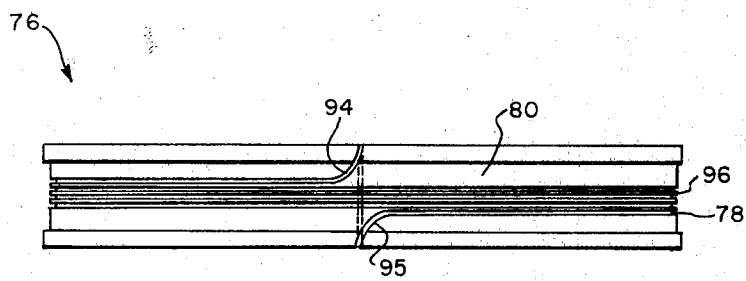
FIGURE 10 is an edge view of a bulging coil.
Figure 11:
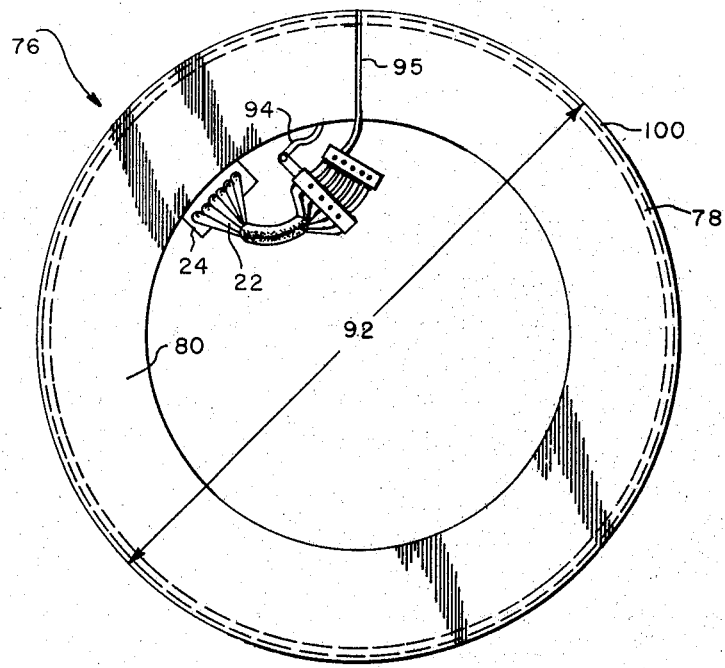
FIGURE 11 is a side elevational view of the bulging coil of FIGURE 10.

FIGURES 10 and 11 show the details of the portable bulging coil 76. Conductor 78 is wound on the outside of the coil form 80 and is recessed considerably from the outside diameter 92 of the coil form 80, for the same reasons already discussed for the constricting coil 12. Coil conductor 78 has lead portions 94 and 95, which lead out from the outside of coil form 80 to the inside of the coil form 80. As may be seen best in FIGURE 10, the lead-out path of lead portions 94 and 95 is rounded, to prevent cutting of coil form 80 by axial stress applied by coil conductor 78, during forming. Lead portions 94 and 95 connect to co-axial cables 22 and the remaining elements of the power supply already described with respect to FIGURE 1.

As may also be seen in FIGURE 10, coil conductor 78 makes four full turns around the outside of coil form 80. Square conductors are used in the bulging coil 76 for the same reason they were used in the constricting coil 12, namely, to prevent shearing off the coil form lands 96, which are located between the turns of conductor 78. Conductor 78 is preferably made of any known material which has good tensile strength and reasonable electrical conductivity. A layer of insulating enamel or varnish 98 is used over the conductor 78 to provide additional protection against voltage breakdown.

A stainless steel split ring, such as ring 64 previously described as a part of the constricting coil 12, is not necessary in the design of the bulging coil 76. Since the conductors 78 in the bulging coil 76 are located on the outside portion of coil form 80, "hoop stress" (tendency of the coil to break apart in a radial direction) is not a problem.

Air gap 100 is an important part of the design of the bulging coil 76. Without proper design, a large coil will fail repeatedly. As explained more fully with respect to the constricting coil 12, providing an air gap of proper dimension does reduce coupling efficiency but produces the beneficial and unexpected result of making the field profile much more constant and therefore making the coil 76 much less sensitive to coupling and energy content variations.

Figure 12:
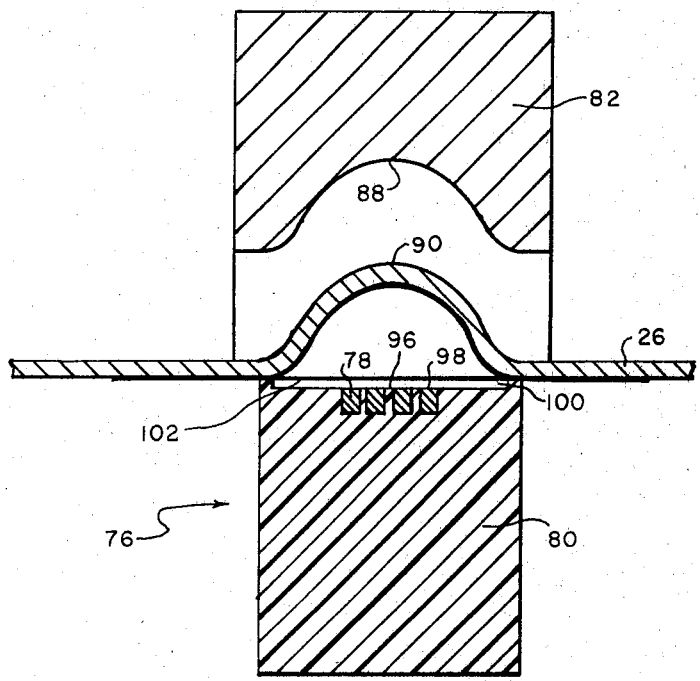
FIGURE 12 is a sectional view showing a bulging coil and a shaping die in position on a large thin-walled tube.

FIGURE 12 shows a sectional view of a tube 26 which has been bulged outwardly so as to form a convex portion 90 on the outside surface of the tube 26. Bulging coil 76 may be seen in position on the inside of the tube 26. Outside die 82 with concave portion 88 is positioned on the outside of the tube 26, directly opposite bulging coil 76. Plastic sleeve 102 is positioned on the inside surface of the tube 26 to prevent arcing between the coil 76 and the tube 26.

Referring first to FIGURE 12, one cycle of operation of the embodiment of the invention suitable for bulging large diameter tubes follows: bulging coil 76 is positioned inside the tube 26 at the point where the tube 26 is to be bulged. Outside die 82 is positioned opposite the coil 76 and is closed. Referring now to FIGURE 1, where the elements of the power supply may be seen, power source 14 furnishes power to capacitor bank 16, where the power is stored. When trigger unit 20 closes ignition switch 18, power from capacitor bank 14 is switched into connector box 24 and then through co-axial transmission lines 22 to bulging coil 76 (FIGURE 12). As may be seen in FIGURE 12, when coil 76 receives the power pulse, tube 26 is bulged outward and tends to conform to the concave inner shape 88 of the outside die 82. In order to achieve the amount of bulging desired, the bulging coil 76 may be pulsed several times in position or it may be pulsed and moved incrementally along the surface of the tube 26. Successive pulses yield a decremental increase in the diameter of the tube 26. After several passes, very fine precision sizing of the tube 26 may be accomplished.

Figure 13:
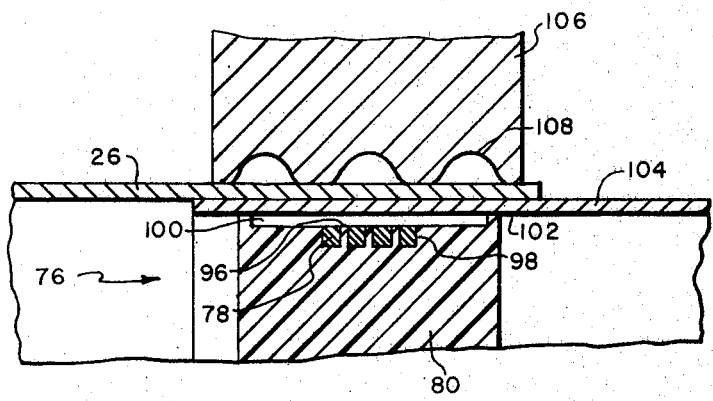
FIGURE 13 is a sectional view showing an arrangement for joining large thin-walled tubes.

FIGURE 13 shows another embodiment of the invention, which is used for joining together two large tubes 26 and 104. To perform the joining operation, the two large tubes 26 and 104, which have slightly different diameters, are arranged with their end portions overlapping. A bulging coil 76, such as has already been described with reference to FIGURES 9 to 12, is positioned inside the smaller tube 104. A shaping die 106 having a plurality of concave portions 108 is arranged on the outside of the outer tube 26 at a point opposite the bulging coil. A plastic sleeve 102 is arranged on the inside surface of tube 104 so as to insulate the bulging coil 76 from the tube 104. When the bulging coil 76 is pulsed in a manner already described for the other embodiments of the invention, both tubes 26 and 104 are bulged outwardly against forming die 106. Tubes 26 and 104 are then crimped together. Their overlapping portions have a corrugated configuration, with convex portions caused by the tubes 26 and 104 being forced against the concave portions 108 of forming die 106.

The coil 76 may be pulsed more than once in place if necessary to properly join tubes 26 and 104. Also, coil 76 may be moved incrementally and pulsed, if necessary to create a longer crimped overlap portion of the tubes 26 and 104. However, the outside forming die 106 will normally remain stationary, in joining operations, whether or not the bulging coil 76 is moved.

Another method of joining the overlapping end portions of two large thin-walled tubes is by using a constricting coil outside the tubes and a special mandrel inside the tubes. However, this method is perhaps less convenient than the method and apparatus for joining which is disclosed above. This is because of the fact that, after the joining operation is completed, difficulty is experienced in getting the mandrel out of the tubes. This problem could be solved, of course, by constructing a special mandrel which: (1) may be disassembled or (2) is cut diagonally across its circumference, so its diameter may be reduced, for removal.

From the foregoing it may be seen that the applicants have invented novel methods for constricting, bulging, and joining *large* thin-walled tubes and novel apparatus for carrying out each of the methods. The invention allows a fantastically high strain rate which, coupled with the isodynamic nature of the applied force, results in optimum formability without surface marring of the workpiece, and permits working in hard materials directly. The operation is quite fast in all instances, since pulse duration is only a few hundred micro-seconds and high repetition rates can be obtained. The equipment is lightweight and portable, yet strong enough to withstand the tremendous stresses present in equipment performing a sizing job of this magnitude. It is easy to achieve very fine precision sizing, even in *very large* diameter tubes or cylinders, either in bulging or constricting. If tolerances of the order of .020 inch to .030 inch are acceptable, then no mandrels or dies are needed, and free forming is quite satisfactory.

Obviously, numerous modifications and variations of the present invention are possible in the light of the above teachings. It is therefor to be understood that, within the scope of the attendant claims, the invention may be practiced otherwise than is specifically described.

What is claimed is:

1. A method of high precision magnetomotive constricting of large diameter metal tubes comprising the steps of:
   (a) suspending a magnetomotive sizing coil from a hoist,
   (b) moving the coil to the site of the tube to be constricted,
   (c) placing an undersized mandrel inside the tube at the point where the tube is to be constricted,
   (d) covering the outer portion of the tube to be constricted with a thin plastic insulating sleeve,
   (e) positioning the coil outside the tube at a point opposite the mandrel,
   (f) passing a high voltage high current pulse through the coil, so as to constrict the tube in the vicinity of the coil.

2. The method of high precision magnetomotive constricting of large diameter metal tubes of claim 1 including the further step of pulsing the coil periodically in the same position, so as to produce decremental decreases in the diameter of the tube to be constricted.

3. The method of high precision magnetomotive constricting of large diameter metal tubes of claim 1 including the further steps of:
   (a) pulsing the coil periodically and
   (b) moving both the coil and the mandrel incrementally along the portion of the tube which is to be constricted, between the periodic pulses.

4. The method of high precision magnetomotive constricting of large diameter metal tubes of claim 3 including the further steps of:
   (a) continuing to pulse the coil periodically and
   (b) continuing to move both the coil and the mandrel incrementally back and forth along the same portion of the tube, between the periodic pulses, so as to produce decremental decreases in the size of the tube to be constricted.

5. A method of high precision magnetomotive bulging of large diameter metal tubes comprising the steps of:
   (a) suspending a magnetomotive sizing coil from a hoist,
   (b) moving the coil to the site of the tube to be bulged,
   (c) covering the inner portion of the tube to be bulged with a thin plastic insulating sleeve,
   (d) positioning the coil inside the tube at the point where the tube is to be bulged, so that the coil conductors are adjacent to the tube but are spaced from it,
   (e) positioning a forming die outside the tube at a point opposite the coil,
   (f) passing a high voltage, high current pulse through the coil, so as to constrict the tube in the vicinity of the coil.

6. The method of high precision magnetomotive bulging of large diameter metal tubes of claim 5 including the further step of:
   (a) pulsing the coil periodically in the same position, so as to produce decremental increases in the size of the tube to be bulged.

7. The method of high precision magnetomotive bulging of large diameter metal tubes of claim 5 including the further steps of:
   (a) pulsing the coil periodically and
   (b) moving both the coil and the forming die incrementally along the portion of the tube which is to be bulged, between the periodic pulses.

8. The method of high precision magnetomotive bulging of large diameter metal tubes of claim 7 including the further steps of:
   (a) continuing to pulse the coil periodically and
   (b) continuing to move both the coil and the forming die incrementally back and forth along the same portion of the tube, between the periodic pulses, so as to produce decremental increases in the size of the tube to be bulged.

9. A method of high precision magnetomotive joining of large diameter metal tubes comprising the steps of:
   (a) positioning two large diameter tubes to be joined so that the end of one tube overlaps the end of the other tube,
   (b) covering the inner portion of the smaller tube to be joined with a thin plastic insulating sleeve,
   (c) placing a magnetomotive sizing coil inside the smaller tube at the point where the tubes are to be joined, so that coil conductors are adjacent to the inner tube but are spaced from it,
   (d) passing a high voltage, high current pulse through the coil, so as to bulge both the inner and outer tubes in the vicinity of the coil, in order to make a secure joint.

10. The method of high precision magnetomotive joining of large diameter metal tubes of claim 9 including the further step of pulsing the coil periodically in the same position, so as to make further decremental increases in the diameter of both the inner and outer tubes in the vicinity of the coil.

11. A method of high precision magnetomotive joining of large diameter metal tubes comprising the steps of:
    (a) positioning two large diameter tubes to be joined so that the end of one tube overlaps the end of the outer tube,
    (b) covering the outer portion of the larger tube to be joined with a thin plastic insulating sleeve,
    (c) placing a magnetomotive sizing coil outside the larger tube at the point where the tubes are to be joined, so that coil conductors are adjacent to the outer tube but are spaced from it,
    (d) passing a high voltage, high current pulse through the coil, so as to constrict both the outer and inner tubes in the vicinity of the coil, in order to make a secure joint.

12. The method of high precision magnetomotive joining of large diameter metal tubes of claim 11 including the further step of pulsing the coil periodically in the same position, so as to make further decremental decreases in the diameter of both the outer and the inner tubes in the vicinity of the coil.

References Cited

UNITED STATES PATENTS

| | | | |
|---|---|---|---|
| 2,976,907 | 3/1961 | Harvey et al. | 29—421 X |
| 3,210,842 | 10/1965 | Schwinghamer. | |
| 3,252,313 | 5/1966 | Eilers et al. | 29—421 X |
| 3,347,074 | 10/1967 | Eilers et al. | 72—56 |
| 3,383,890 | 5/1968 | Wildi | 72—56 |
| 3,372,566 | 3/1968 | Schenk et al. | 72—56 |

JOHN F. CAMPBELL, Primary Examiner

D. C. REILEY, Assistant Examiner

U.S. Cl. X.R.

29—421; 72—56